United States Patent
Brown et al.

(10) Patent No.: US 9,864,712 B2
(45) Date of Patent: *Jan. 9, 2018

(54) SHARED RECEIVE QUEUE ALLOCATION FOR NETWORK ON A CHIP COMMUNICATION

(71) Applicant: International Business Machines Corporation, Armonk, NY (US)

(72) Inventors: Jeffrey D. Brown, Rochester, MN (US); Robert A. Shearer, Woodinville, WA (US)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 14/838,073

(22) Filed: Aug. 27, 2015

(65) Prior Publication Data

US 2015/0370736 A1 Dec. 24, 2015

Related U.S. Application Data

(63) Continuation of application No. 14/030,754, filed on Sep. 18, 2013, now Pat. No. 9,378,168.

(51) Int. Cl.
*G06F 13/362* (2006.01)
*H04L 12/911* (2013.01)
(Continued)

(52) U.S. Cl.
CPC ............ *G06F 13/362* (2013.01); *G06F 13/14* (2013.01); *H04L 47/781* (2013.01);
(Continued)

(58) Field of Classification Search
CPC .... G06F 13/362; G06F 13/14; G06F 13/3625; H04L 47/781; H04L 2012/5681; H04L 2012/5679; H04L 49/3045
See application file for complete search history.

(56) References Cited

U.S. PATENT DOCUMENTS 6,141,631 A 10/2000 Blinne et al.
6,460,080 B1 10/2002 Shah et al.
(Continued)

OTHER PUBLICATIONS

State Intellectual Property Office of the People's Republic of China, Office Action; dated Feb. 28, 2017; pp. 1-12; State Intellectual Property Office of the People's Republic of China, China.
(Continued)

*Primary Examiner* — Jing-Yih Shyu
(74) *Attorney, Agent, or Firm* — Middleton Reutlinger

(57) ABSTRACT

A method for communicating data in a processing architecture comprising a plurality of interconnected IP blocks. Transmitting IP blocks may transmit messages to a shared receive queue for a first IP block. Receipt of the messages at the shared receive queue may be controlled based on receive credits allocated to each transmitting IP block. The allocation of receive credits for each transmitting IP block may dynamically managed such that the allocation of receive credits may be dynamically adjusted for each transmitting IP block based at least in part on message traffic associated with each transmitting IP block and/or a priority associated with each transmitting IP block.

14 Claims, 9 Drawing Sheets

(51) Int. Cl.
*G06F 13/14* (2006.01)
*H04L 12/70* (2013.01)
*H04L 12/935* (2013.01)

(52) U.S. Cl.
CPC ...... *G06F 13/3625* (2013.01); *H04L 49/3045* (2013.01); *H04L 2012/5679* (2013.01); *H04L 2012/5681* (2013.01)

(56) References Cited

U.S. PATENT DOCUMENTS

| | | | |
|---|---|---|---|
| 6,594,701 B1* | 7/2003 | Forin | G06F 12/1081 707/E17.036 |
| 7,089,378 B2 | 8/2006 | Chadalapaka et al. | |
| 7,213,087 B1* | 5/2007 | Bertone | H04L 47/39 370/229 |
| 7,408,875 B2 | 8/2008 | Garmire et al. | |
| 7,508,837 B2 | 3/2009 | Elzur | |
| 8,031,729 B2 | 10/2011 | Elzur | |
| 8,683,000 B1 | 3/2014 | Schlansker et al. | |
| 2002/0141427 A1* | 10/2002 | McAlpine | H04L 47/39 370/413 |
| 2002/0178306 A1* | 11/2002 | Shimizu | H04L 47/10 710/56 |
| 2005/0254519 A1* | 11/2005 | Beukema | G06F 13/4208 370/468 |
| 2006/0050639 A1 | 3/2006 | Stuart et al. | |
| 2006/0174050 A1 | 8/2006 | Chadha et al. | |
| 2008/0159149 A1* | 7/2008 | Okuno | H04L 47/11 370/237 |
| 2013/0051397 A1 | 2/2013 | Guo et al. | |
| 2013/0159669 A1 | 6/2013 | Comparan et al. | |
| 2014/0036680 A1* | 2/2014 | Lih | H04L 47/12 370/235 |
| 2014/0269711 A1 | 9/2014 | Ravid et al. | |
| 2014/0328172 A1* | 11/2014 | Kumar | H04L 47/18 370/231 |
| 2015/0081941 A1 | 3/2015 | Brown et al. | |

OTHER PUBLICATIONS

Zhang, Heying et al. "A Multi-VC Dynamically Shared Buffer with Prefetch for Network on Chip". 2012 IEEE Seventh International Conference on Networking, Architecture, and Storage. 2012. IEEE. pp. 320-327.

Cleary, Thomas J. (Examiner), U.S. Patent and Trademark Office, Office Action issued in related application serial No. 14/030,754 dated Dec. 01, 2015.

* cited by examiner

SHARED RECEIVE QUEUE ALLOCATION FOR NETWORK ON A CHIP COMMUNICATION

CROSS-REFERENCE TO RELATED APPLICATIONS

This application is a continuation of U.S. patent application Ser. No. 14/030,754, filed on Sep. 18, 2013 by Jeffrey D. Brown et al., and entitled SHARED RECEIVE QUEUE ALLOCATION FOR NETWORK ON A CHIP COMMUNICATION, the entire disclosure of which is incorporated by reference herein.

FIELD OF THE INVENTION

The invention is generally related to data processing in a computing system including a plurality of interconnected processing blocks (i.e., nodes), and in particular to processor architectures and communication architectures incorporated therein.

BACKGROUND

A network on a chip (NOC) is a novel integrated circuit architecture that applies a network-based architecture to a single chip to create a unique processing unit. A typical NOC includes a plurality of integrated processor (IP) blocks coupled to one another via the network. NOC processing units typically distribute (i.e., allocate) various parts of a job to different hardware threads of one or more IP blocks to be executed by the one or more IP blocks in the NOC processing unit, where the distribution typically includes transmitting data packets (i.e., messages) including one or more data words between one or more IP blocks of the NOC. With the number of IP blocks in the standard computer systems expected to rise, efficiently handling workload distribution and message communication has become increasingly demanding.

Moreover, during processing of a job, IP blocks generally communicate data therebetween as directed by the tasks of the workload, where an IP block may receive data from one or more transmitting IP blocks. Data communicated from one IP block to another is generally stored in buffer associated with the receiving IP block. With multiple IP blocks potentially transmitting to a single IP block, in conventional systems deadlocks, livelocks and storage starvation issues may arise if inadequate buffer storage is available for the receiving IP block. In some conventional systems, once a buffer for an IP block becomes full, the receiving IP block may drop transmitted data packets (i.e., fail to store received data packets). To address these issues, conventional systems generally overbuild buffers such that each IP block is associated with buffer space that exceeds hardware/software requirements. While overbuilding a buffer may address some problems associated with communications for distributed processing systems, as the number of IP blocks is expected to rise, the increasing amount of space dedicated to buffers in an NOC configuration becomes an increasingly wasteful solution.

A continuing need exists in the art for a manner of communicating data messages in computing systems including a plurality of interconnected integrated processor blocks.

SUMMARY OF THE INVENTION

The invention addresses these and other problems associated with the prior art by controlling receipt of messages at a shared receive buffer for a first IP block based on receive credits allocated IP blocks transmitting to the first IP block. Consistent with embodiments of the invention, a receive credit corresponds to a quantity of messages that may be received at the shared receive buffer from a particular transmitting IP block for a given time period. Each transmitting IP block is allocated a quantity of receive credits that limits the quantity of messages that the transmitting IP block may send to the shared receive queue for the first IP block in the given time period. Moreover, the allocation of receive credits for each transmitting IP block is dynamically managed such that the messages received at the shared receive buffer for the first IP block do not exceed storage allocated to the first IP block.

The first IP block (i.e., the receiving IP block) dynamically manages the allocation of the receive credits to thereby limit the quantity of messages received at the shared receive buffer for the first IP block for the given time period. The allocation of receive credits thereby limits the quantity of messages that each IP block may transmit to the shared receive buffer for the first IP block as well as the total quantity of messages that may be transmitted to the shared receive buffer for the first IP block. Therefore, consistent with some embodiments of the invention, a transmitting IP block may be limited in the quantity of messages that may be sent to a particular receiving IP block for a given time period based on the quantity of receive credits corresponding to the receiving IP block that are allocated to the transmitting IP block.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

Figure 1:
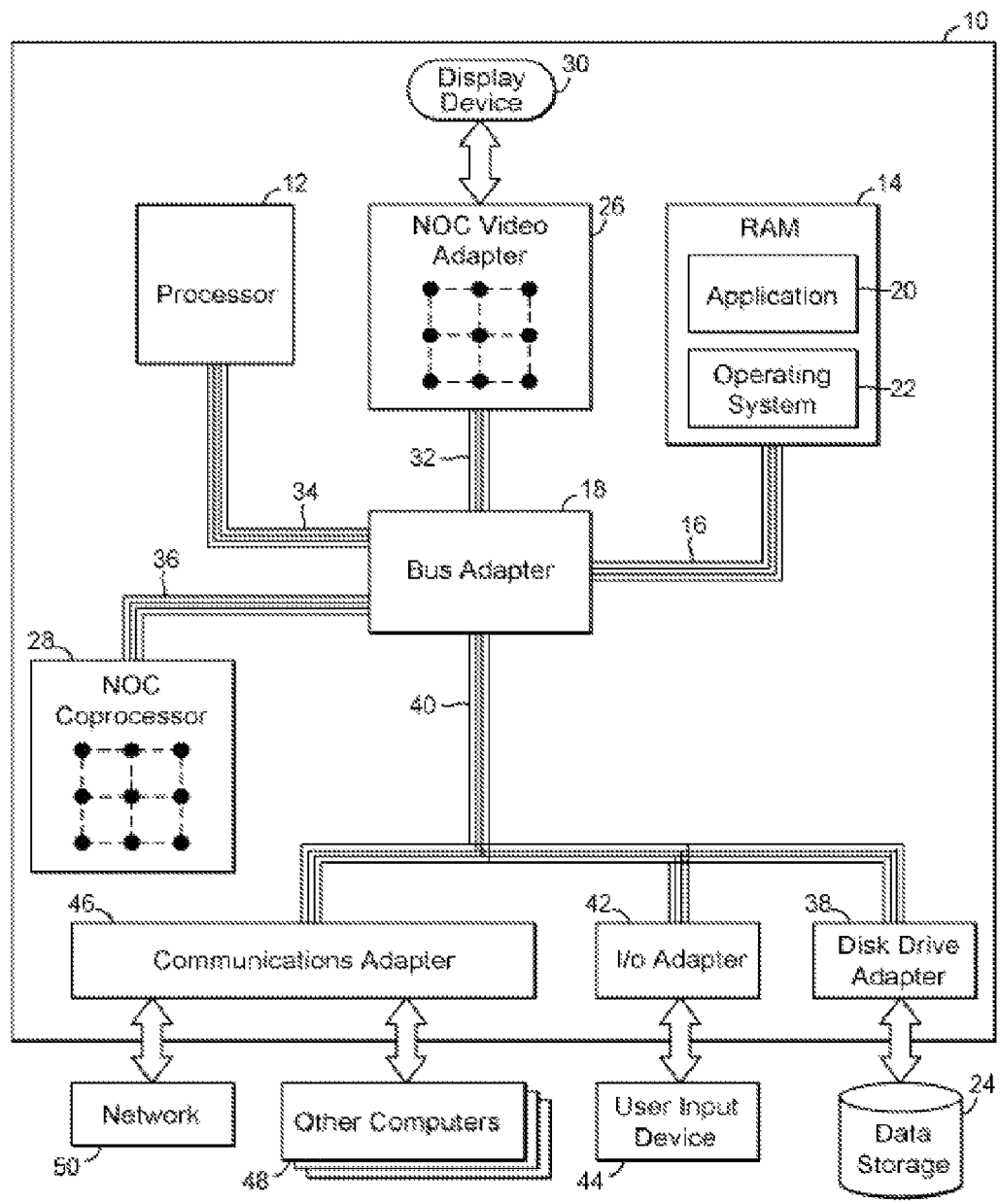
FIG. 1 is a block diagram of exemplary automated computing machinery including an exemplary computer useful in data processing consistent with embodiments of the present invention.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments of the invention provide a circuit arrangement and method for controlling data communication from one or more transmitting IP blocks to a shared receive buffer for a receiving IP block. Consistent with embodiments of the invention, receipt of messages at a shared receive buffer for a first IP block is controlled based on receive credits allocated to IP blocks transmitting messages to the first IP block. The allocated receive credits limit the number of messages that each transmitting IP block may send to the shared receive buffer for the first IP block in a given time period. In addition, the allocation of receive credits for each transmitting IP block is dynamically managed such that receive credits may be reclaimed, reallocated and/or additional receive credits allocated based at least in part on load and/or priority. As messages in the shared receive queue for the first IP block are processed and/or the given time limit associated with the receive credits expires, the transmitting IP blocks may receive more receive credits that corresponds to the available storage space for the first IP block in the shared receive buffer.

In some embodiments consistent with the invention, the shared receive queue may include a credit counter for each transmitting IP block, and the counter may be incremented responsive to receiving a message from the transmitting IP block. Therefore, embodiments of the invention may determine a rate of usage of allocated receive credits for each transmitting IP block. In such embodiments, dynamically managing the allocation of receive credits for the transmitting IP blocks may include adjusting the allocation of receive credits for one or more transmitting IP blocks based at least in part on the rate of usage. For example, if a transmitting IP block is using all allocated receive credits in half of the given time, the transmitting IP block may be allocated additional receive credits. As another example, if a transmitting IP block is using only half the receive credits allocated to it, one or more allocated receive credits may be reclaimed.

In general, the shared receive queue allocates a non-zero number of receive credits to each IP block transmitting to the first IP block. The quantity (i.e., number) of receive credits allocated to each transmitting IP block may be based at least in part on a priority associated with each transmitting IP block. In addition, the quantity of receive credits allocated to each transmitting IP block may be based at least in part on a rate at which each transmitting IP block uses allocated receive credits which generally corresponds to the rate at which each transmitting IP block sends messages to the shared receive buffer for the first IP block. Moreover, the total quantity of receive credits allocated to transmitting IP blocks is based at least in part on the storage capacity of the shared receive queue associated with the first IP block.

The given time associated with the receive credits (i.e., the time window in which the receive credits may be used) may be based at least in part on a round trip latency of the system. Such round trip latency corresponds to a time in which a transmitting IP block may communicate a message to the shared receive queue and receive a response therefrom. Moreover, the given time may be configurable for the system, where the given time may be configured such that transmitting IP blocks cannot starve other transmitting IP blocks executing tasks that require the sending of messages. For example, the given time may be based at least in part on a maximum amount of time that each transmitting IP block may wait to send a message to the first IP block.

Moreover, embodiments of the invention dynamically manage the allocation of the receive credits such that the receive credits allocated to each transmitting IP block may be adjusted based at least in part on usage (e.g., a rate at which the transmitting IP block sends messages/uses allocated receive credits) and/or priority. The dynamic management of the receive credit allocation facilitates fine grained control of the shared receive queue as well as low response times to changes in message communication traffic. For example, if a transmitting IP block ends processing of a task, the transmitting IP block may stop sending messages to the shared receive queue for the first IP block. Based on the transmitting IP block not sending messages to the shared receive queue, the usage of the transmitting IP block would indicate that the transmitting IP block has stopped sending messages to the shared receive queue for the first IP block. In response to the usage for the transmitting decreasing, allocated receive credits may be reclaimed. Moreover, the reclaimed receive credits may be allocated to another transmitting IP block. Hence, as illustrated in this example, the allocation of receive credits for each transmitting IP block may be dynamically managed such that the allocation of receive credits is adjusted in response to message traffic changes. Similarly, the allocation of receive credits for each transmitting IP block may be dynamically managed such that the allocation of receive credits is adjusted based at least in part on a priority associated with each transmitting IP block.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
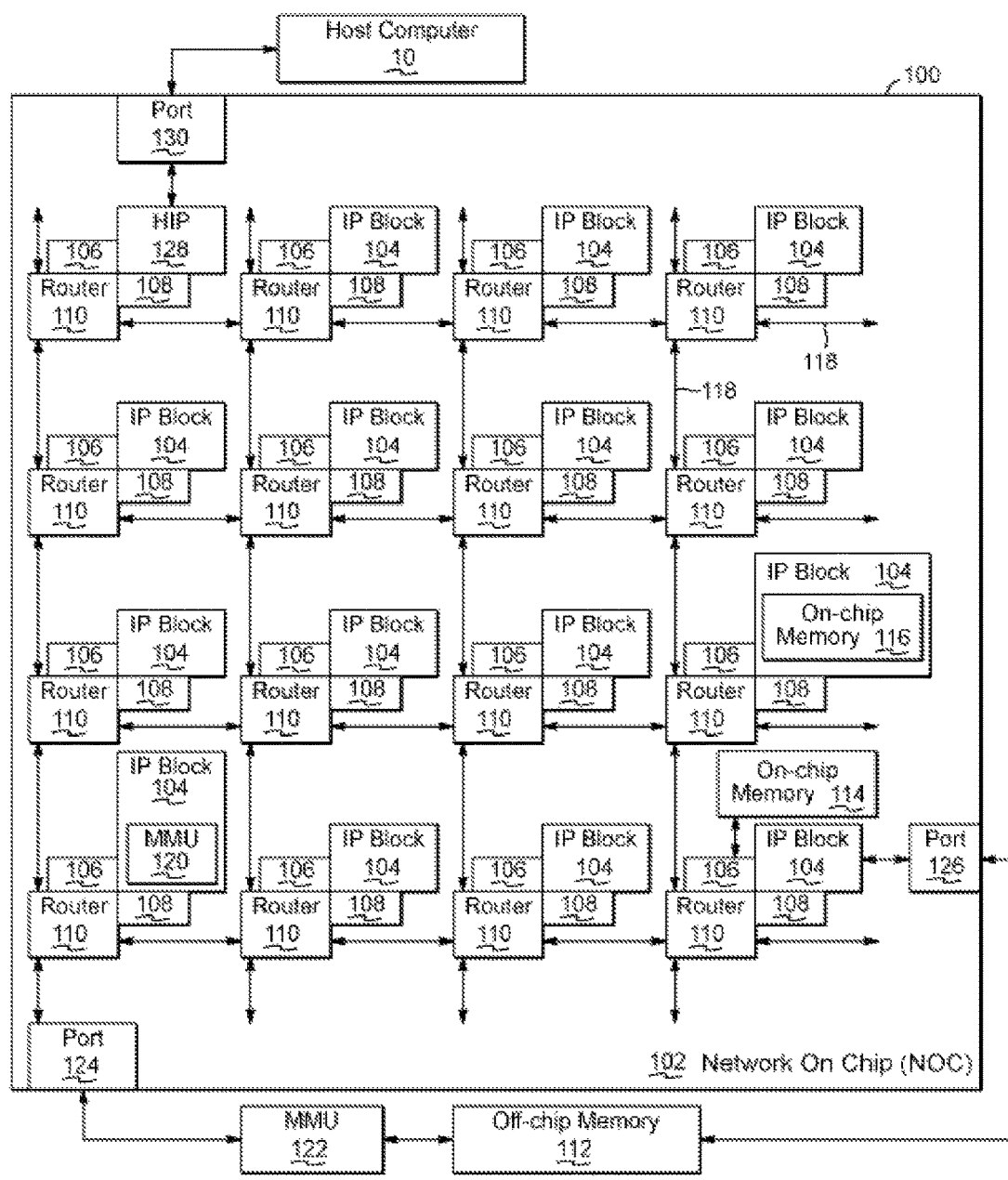
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller 106 controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory 116 enabled as an IP block, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
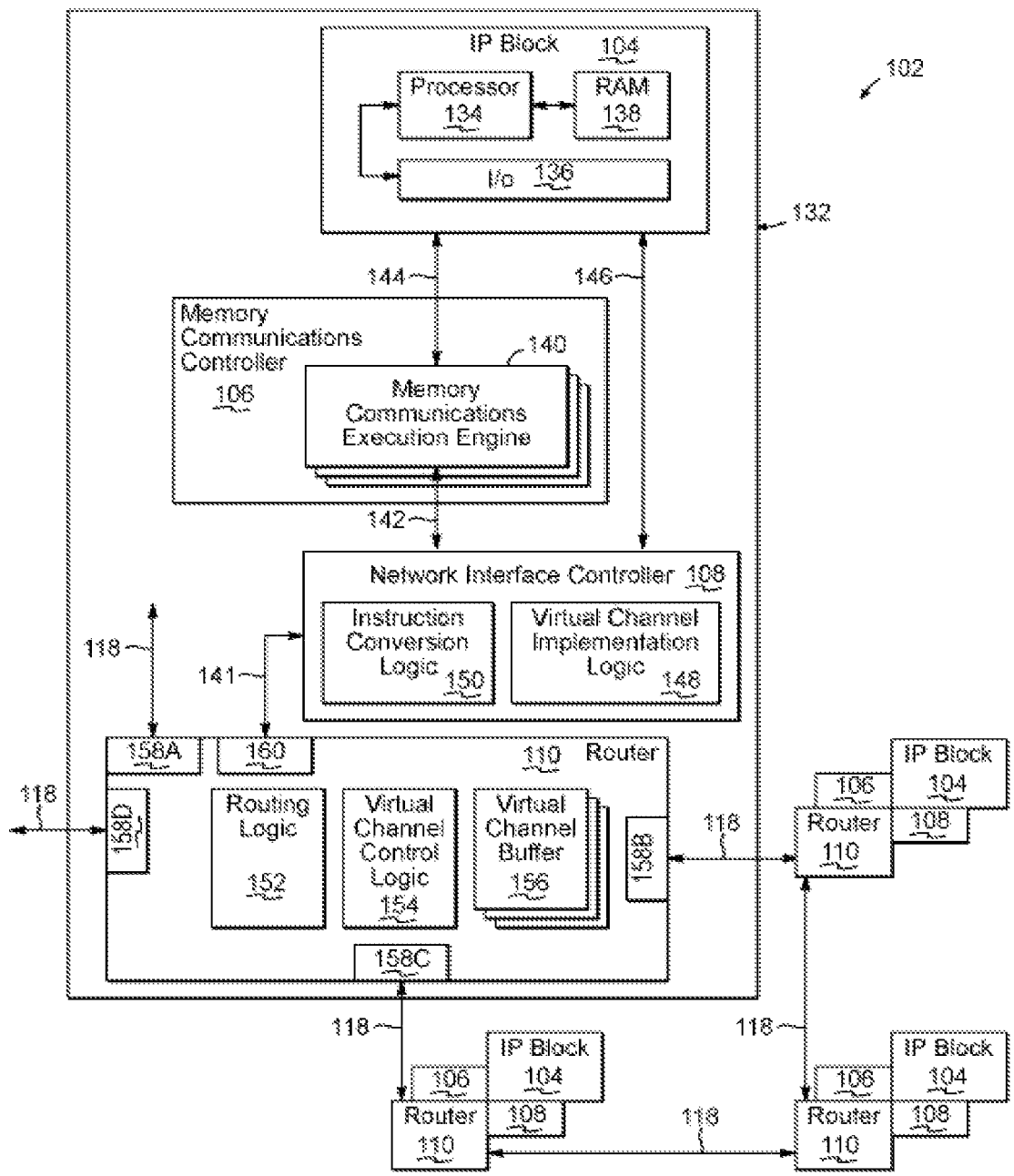
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications execution engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
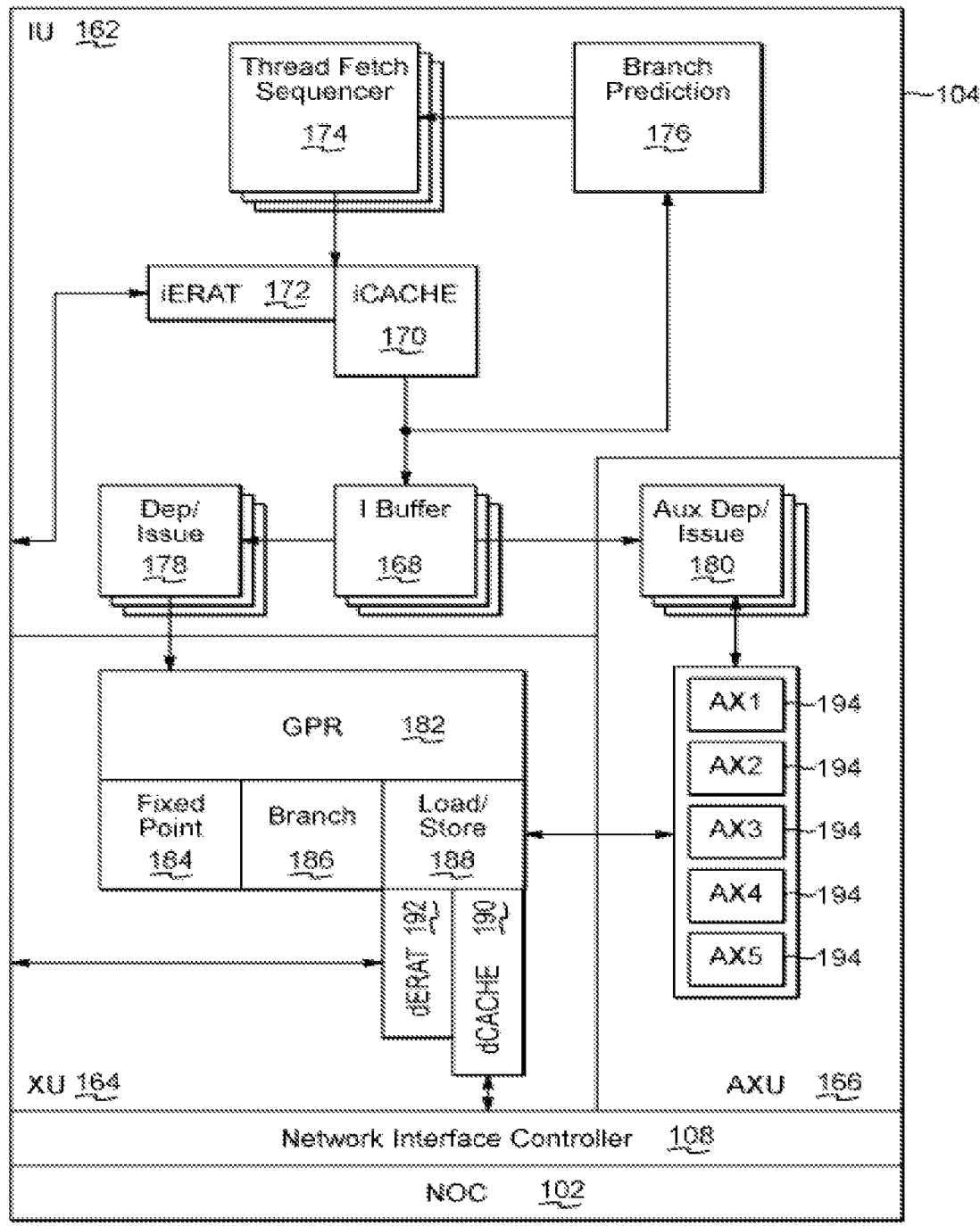
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multi-threaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32 b or 64 b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Shared Receive Queue Receive Credit Allocation

Figure 5:
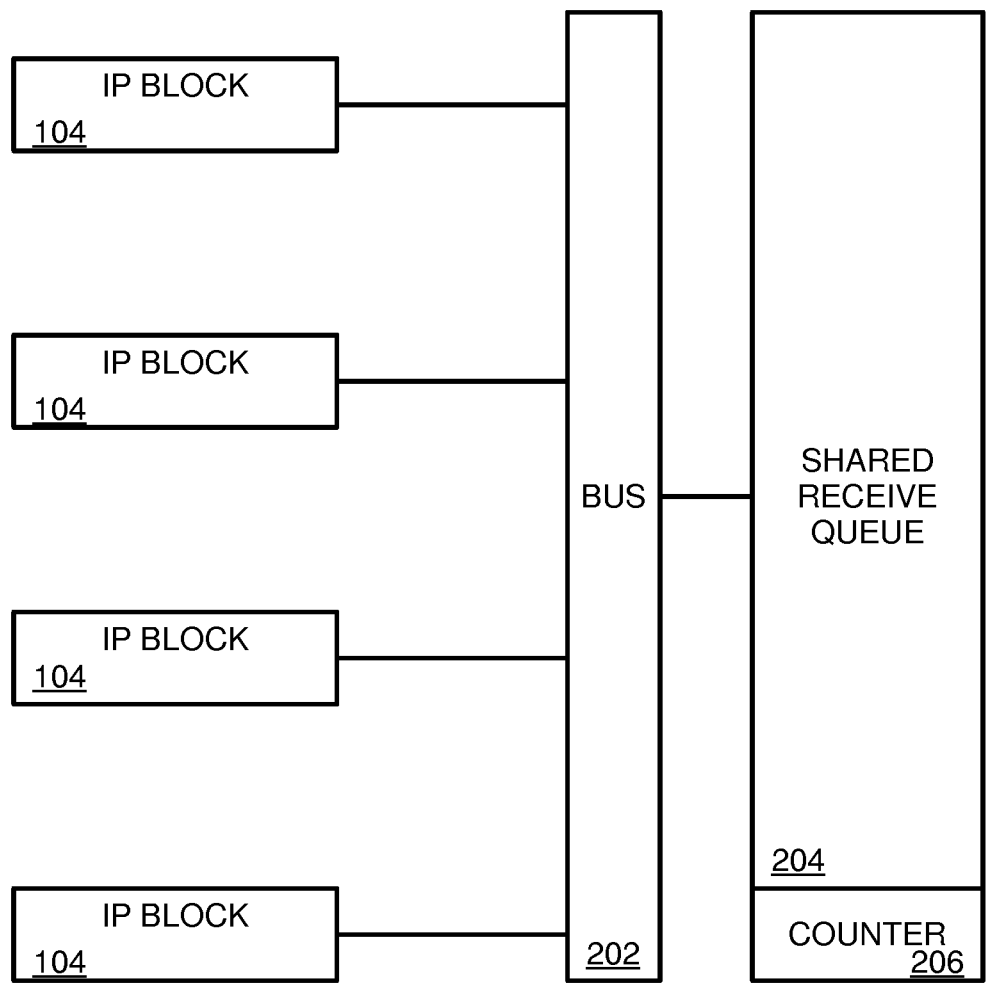
FIG. 5 is a block diagram illustrating an exemplary implementation of a plurality of interconnected IP blocks of FIG. 4 coupled to a shared receive queue that may be incorporated into the NOC of FIG. 2.

Turning now to FIG. 5, this figure provides a block diagram of a plurality of interconnected IP blocks 104 that may be configured in the NOC 102 of FIG. 2. As shown, the interconnected IP blocks 104 may be connected to a communication bus 202 and a shared receive queue 204. In general, the shared receive queue 204 may receive messages for one or more IP blocks 104 for processing thereby. Moreover, the shared receive queue 204 generally includes storage capacity reserved for each IP block that receives messages at the shared receive queue 204. In general, the storage capacity for each IP block at the shared receive queue 204 may be based on a quantity of messages that may be stored for a particular IP block in the shared receive queue 204. In addition, the shared receive queue 204 may include counter logic 206 that is configured to update a counter for each transmitting IP block responsive to receiving a message at the shared receive queue for a receiving IP block. Furthermore, consistent with some embodiments of the invention, IP blocks 104 may be configured on one or more integrated circuit devices. For example, IP blocks 104 may be configured in a system on a chip configuration using a NOC architecture, and/or on a plurality of interconnected integrated circuits.

Figure 6:
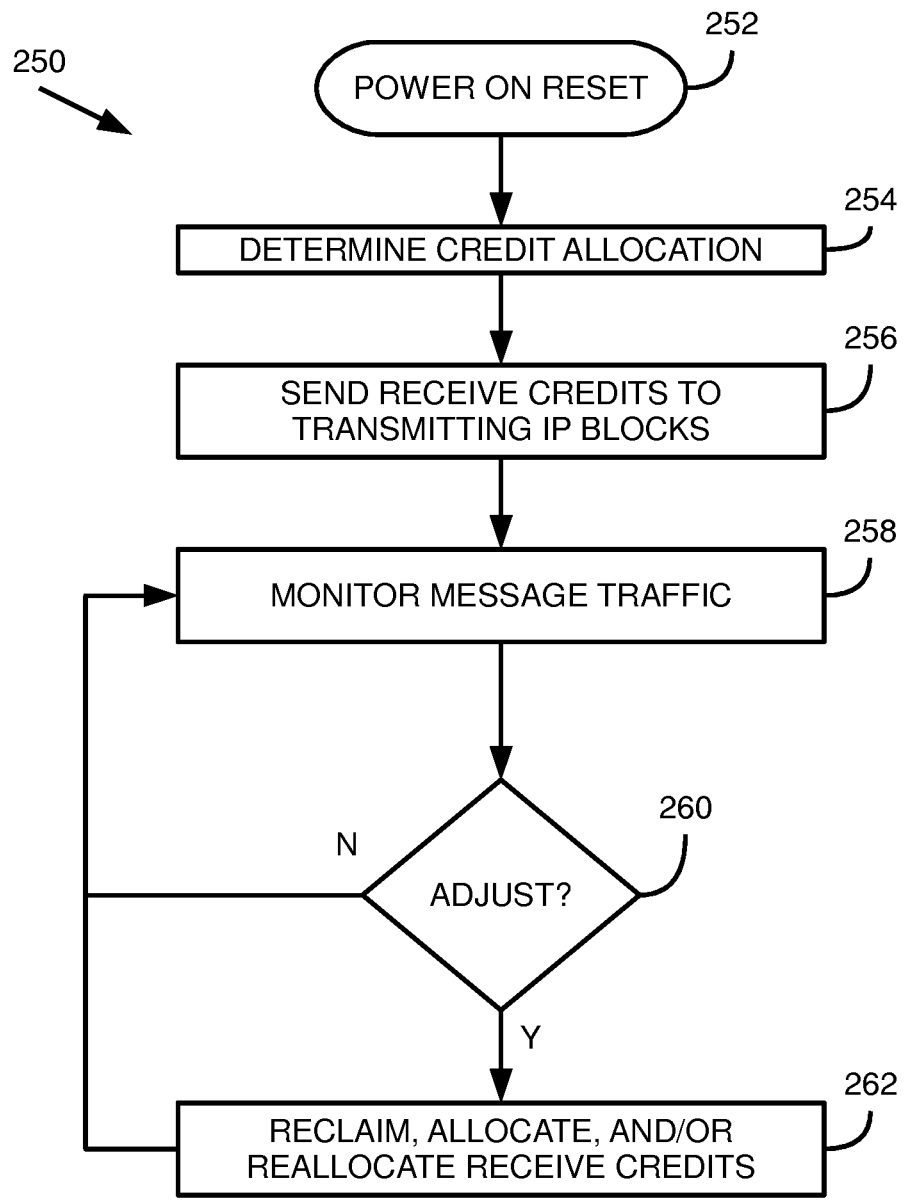
FIG. 6 is a flowchart illustrating a sequence of operations that may be performed to control the receipt of messages at the shared receive queue of FIG. 5.

FIG. 6 provides a flowchart 250 illustrating a sequence of operations that may be performed by a shared receive queue consistent with embodiments of the invention to control the receipt of messages for an IP block at the shared receive queue. At power on reset (POR) (block 252), the shared receive queue determines a receive credit allocation for all IP blocks processing tasks that transmit messages to a first IP block (block 254). In some embodiments, each transmitting IP block may be allocated an equal amount of receive credits, and based on the message traffic from each transmitting IP block, the allocation may be adjusted over time. In some embodiments, the allocation of receive credits may be based at least in part on a priority associated with each transmitting IP block, such that a transmitting IP block processing one or more tasks having a higher associated priority may be allocated a higher quantity of receive credits compared to a transmitting IP processing one or more tasks having a lower associated priority.

Furthermore, the total quantity of receive credits allocated to the transmitting IP blocks is based at least in part on a storage capacity of the shared receive queue for the first IP block. For example, if each receive credit corresponds to one message, and the shared receive queue may store thirty-two messages for the first IP block for the given time period, the shared receive queue may allocate a maximum of thirty-two total receive credits for the transmitting IP blocks. While the total quantity of allocated receive credits allocated to the transmitting IP blocks is based at least in part on the storage capacity, the maximum quantity of receive credits is not necessarily allocated. In some embodiments, the shared receive queue may allocate less receive credits than the maximum such that additional receive credits may be held in reserve. The additional receive credits may be allocated responsive to message traffic for the first IP block. For example, if a particular transmitting IP block is sending messages at a high rate (i.e., has a high rate of usage), the shared receive queue may allocate one or more of the additional receive credits to the particular transmitting IP block.

The shared receive queue sends the allocated receive credits to the transmitting IP blocks (block 256), and the message traffic for the first IP block is monitored at the shared receive queue (block 258). In some embodiments, the shared receive queue maintains a counter for each transmitting IP block and the shared receive queue updates the counter (e.g., increments or decrements) for each message received from the transmitting IP block for the first IP block during the given time period. As the messages are processed by the first IP block, receive credits are returned to the transmitting IP blocks. When returning receive credits, additional credits may be allocated to one or more transmitting IP blocks and/or less credits than previously allocated may be allocated to one or more transmitting IP blocks. Therefore, based at least in part on the message traffic for each transmitting IP block, the shared receive queue may adjust the allocation of receive credits for each transmitting IP block (block 260). If the allocation of receive credits is to be adjusted at one or more of the transmitting IP blocks based on the message traffic ("Y" branch of block 260), the shared receive queue may communicate a message to the one or more IP blocks reclaiming receive credits, allocating additional receive credits, and/or reallocating receive credits reclaimed from another transmitting IP block (block 262).

Figure 7A:
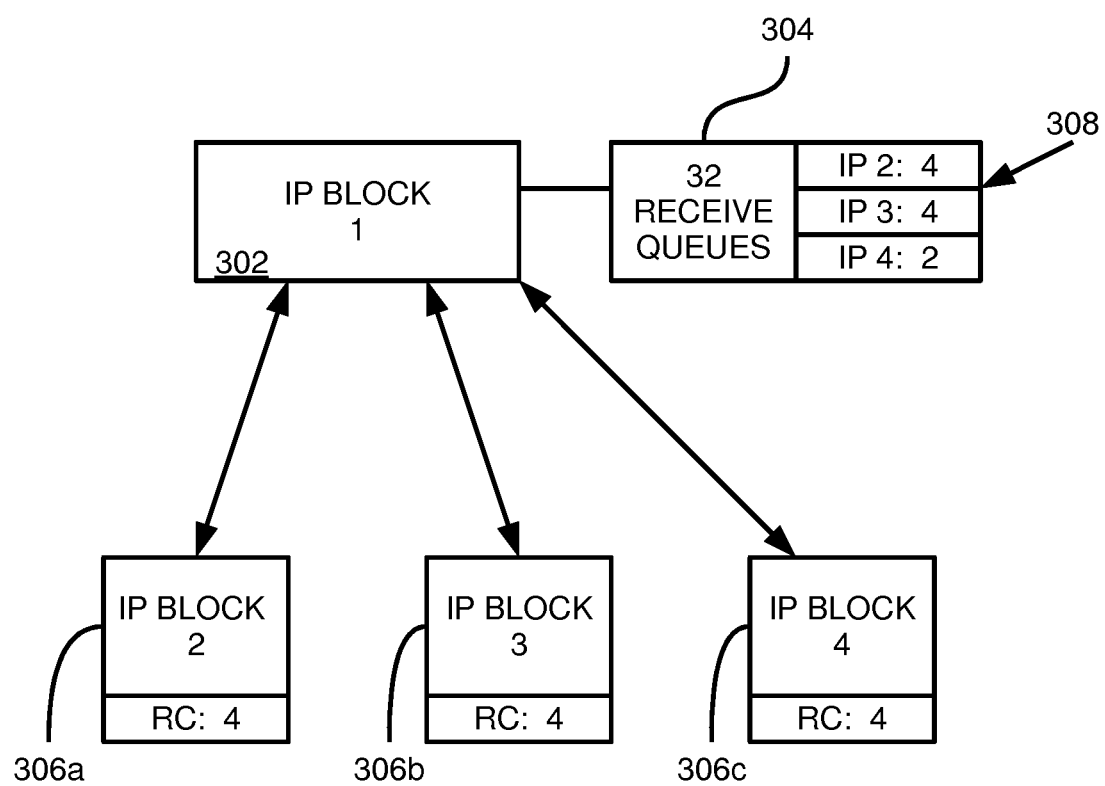
FIGS. 7A-C are block diagrams illustrating an example of the allocation of receive credits at different times for transmitting IP blocks communicating messages to the shared receive queue of FIG. 5 for processing by a receiving IP block.
Figure 7B:
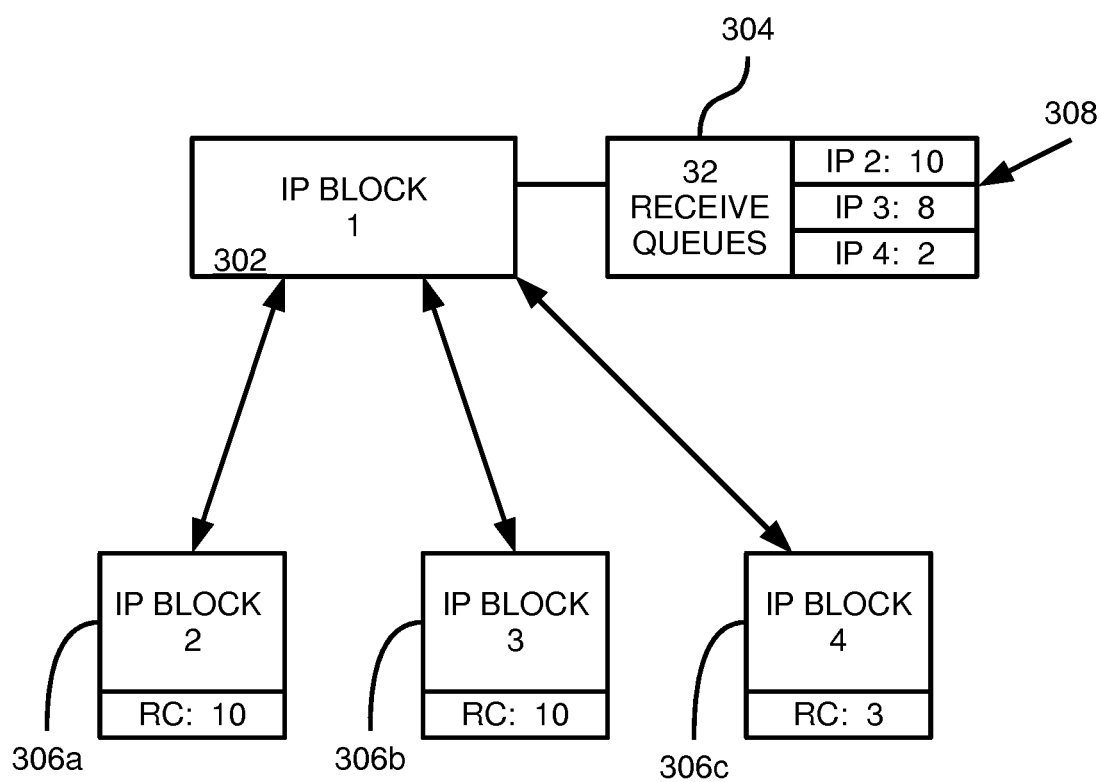
Figure 7C:
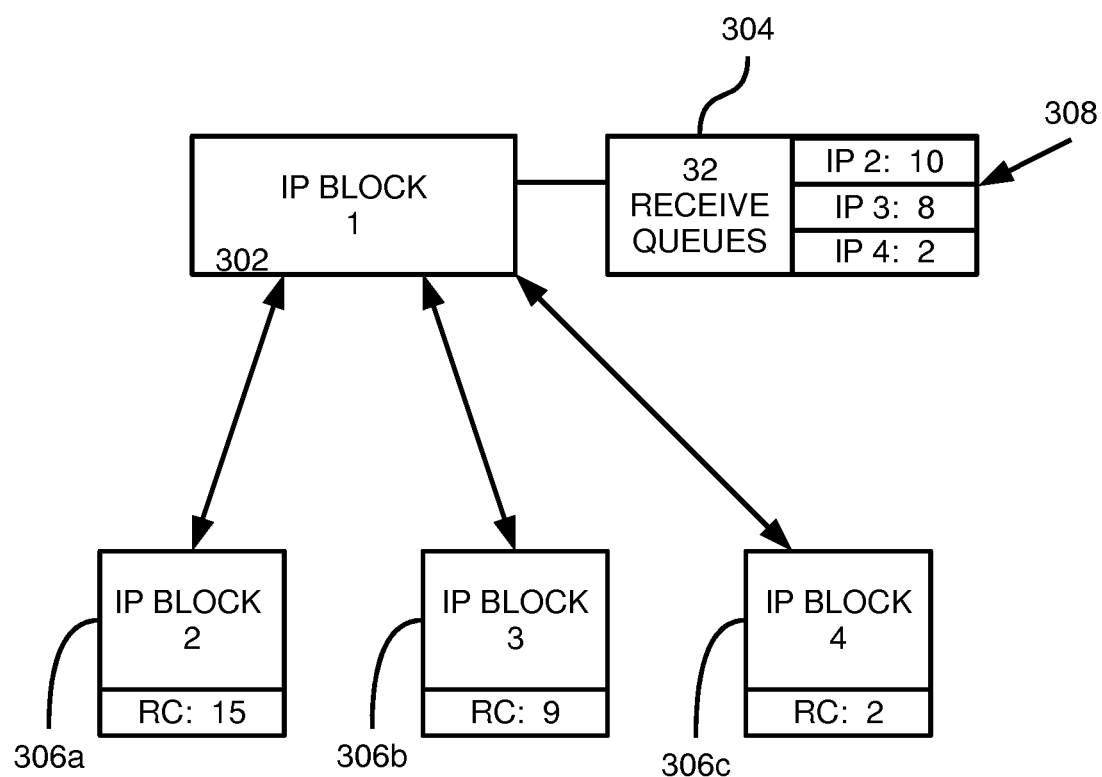

Turning now to FIGS. 7A-C, these figures provide an example block diagram illustrating the dynamic management of receive credit allocation performed by embodiments of the invention. In this example, a first IP block 302 (also labeled 'IP BLOCK 1') is associated with 32 receive queue entries of a shared receive queue 304. Three transmitting IP blocks 306a-c (also labeled 'IP BLOCK 2', 'IP BLOCK 3', and 'IP BLOCK 4', respectively) are processing tasks that cause messages to be sent to the shared receive queue 304 for the first IP block 302. The shared receive queue 304 includes a counter 308 for each transmitting IP block 306a-c.

As shown in FIG. 7A, each transmitting IP block 306a-c is allocated 4 receive credits for sending messages to the shared receive queue 304 for the first IP block. In this example, each receive credit corresponds to a message that may be received at the shared receive queue 304. As such in the example shown in FIG. 7A, each transmitting IP block 306a-c may send 4 messages to the shared receive queue 304 for the first IP block 302. Therefore, in this example, a quantity of receive credits less than the maximum (i.e., 32 receive tokens) have been allocated to the transmitting IP blocks 306a-c. Specifically, the storage capacity associated with the first IP block 302 at the shared receive queue 304 is 32 messages, however only 12 receive credits have been allocated to the transmitting IP blocks 306a-c. In this example, 20 receive credits are held in reserve. The example allocation of FIG. 7A illustrates the allocation of receive credits that may occur at power on recovery (POR), i.e., startup of processing, where message traffic is unknown until the transmitting IP blocks 306a-c begin sending messages. In this example, the shared receive queue 304 allocates an equal quantity of receive credits to each transmitting IP block 306a-c.

The counter 308 indicates message traffic for each transmitting IP block 306a-c, i.e., the quantity of messages that have been communicated to the shared receive queue 304 for the first IP block 302. As shown, in this example, IP BLOCK 2 306a communicated 4 messages to the shared receive queue 304 according to the counter for IP BLOCK 2 306a. Similarly, IP BLOCK 3 communicated 4 messages and IP BLOCK 4 communicated 2 messages. Hence, according to the counter 308, IP BLOCK 2 306a and IP BLOCK 3 306b used all allocated receive credits, which may indicate that additional receive credits may be allocated to those IP blocks 306a,b. IP BLOCK 4 306c used less receive credits than allocated, which may indicate that one or more receive credits may be reclaimed from IP BLOCK 4 306c.

In FIG. 7B, the allocation of receive credits for the transmitting IP blocks 306a-c is dynamically managed by the shared receive queue 304 to adjust the allocation of FIG. 7A based at least in part on message traffic. Since both IP BLOCK 2 306a and IP BLOCK 3 306b used all allocated receive credits in FIG. 7A, additional receive credits have been allocated thereto. In this example, both IP blocks 306a, b have been allocated 10 receive credits. In contrast, IP BLOCK 4 306c did not use all allocated receive credits in FIG. 7A, and the allocation for IP BLOCK 4 306c has been reduced to 3 receive credits. According to the counter 308, the message traffic using the adjusted allocation of receive credits indicates that IP BLOCK 2 306a used the 10 allocated receive credits, IP BLOCK 3 306b used 8 of the 10 allocated receive credits, and IP BLOCK 4 306c used 2 of the 3 allocated receive credits. Therefore, in this example, the message traffic indicates that IP BLOCK 2 306a may be allocated additional receive credits, and IP BLOCK 3 306b and IP BLOCK 4 306c may have one or more receive credits reclaimed.

FIG. 7C illustrates an allocation of receive credits for the transmitting IP blocks 306a-c based on the message traffic shown in FIG. 7B. In this example, the shared receive queue 304 has further adjusted the receive credit allocation such that IP BLOCK 2 306a is allocated 15 receive credits, IP BLOCK 3 306b is allocated 9 receive credits, and IP BLOCK 4 306c is allocated 2 receive credits. Based on the message traffic indicated by the counter 308, IP BLOCK 2 and IP BLOCK 3 used less receive credits than allocated, and IP BLOCK 4 used the number of receive credits allocated.

The example provided in FIGS. 7A-C illustrates the dynamic management of receive credit allocation that may be performed by embodiments of the invention. In this example, the allocation of receive credits was adjusted responsive to message traffic for each transmitting IP block 306a-c. Moreover, as shown, the total quantity of receive credits allocated to transmitting IP blocks 306a-c was based at least in part on storage limitations associated with the shared receive queue 304. The example illustrates that embodiments of the invention may control receipt of messages at the shared receive queue by limiting the quantity of messages that each transmitting IP block may send to the shared receive queue based on an allocation of receive credits allocated to each transmitting IP block.

Moreover, by controlling the receipt of messages at the shared receive queue, embodiments of the invention are configured to receive every message that may be transmitted to the shared receive queue, i.e., based on the allocation of receive credits, storage space at the shared receive queue is available for all messages that are transmitted to the shared receive queue according to the allocation of receive credits. As such, embodiments of the invention limit the sending/receipt of messages to thereby insure that sent messages are not dropped due to lack of storage space at the shared receive queue. Moreover, embodiments of the invention may limit the sending/receipt of messages to thereby insure storage space for the messages without overbuilding the storage space of the shared receive queue. Furthermore, some processing systems may require that all messages be received and stored (i.e., not dropped) to function properly, and embodiments of the invention may be incorporated therein to insure that all inter-processing block communications are receive and stored (i.e., not dropped).

While the example provided in FIGS. 7A-C illustrate adjusting receive credits after allocating an even amount to all transmitting IP blocks at POR and dynamically managing the allocation of receive credits based on message traffic, the invention is not so limited. In some embodiments, the allocation of receive credits may be based at least in part on a priority associated with one or more transmitting IP blocks. Moreover, while the example illustrates all the transmitting IP blocks continuing to transmit, those skilled in the art will recognize that the transmitting IP blocks may start, stop, and resume transmitting at various times. Embodiments of the invention monitor changes in message traffic and may adjust the receive credit allocation responsive to such changes in message traffic, including for example, an idle transmitting IP block starting to send messages, a high usage transmitting IP block stopping sending messages, a new transmitting IP block beginning to send messages, etc.

Moreover, the given time associated with each receive credit is a generally based on the amount of time between a message being received at the shared receive queue and the receive credit being returned to the transmitting IP block, where such amount of time may be referred to as the window of latency. In general, a receive credit is returned after use to a transmitting IP block when the corresponding message(s) are removed from the shared receive queue for processing by the first IP block. Hence, in embodiments of the invention, the receiving of messages, processing of messages, and allocating of receive credits is a continuous/ongoing process. Hence, while the example provided in FIGS. 7A-C provides a static representation of the allocation of receive credits, the invention is not so limited. In general, the shared receive queue continuously monitors message traffic and/or a priority associated with transmitting IP blocks, and embodiments of the invention dynamically adjust the allocation of receive credits on a continuous basis based at least in part on message traffic for each transmitting IP block and/or a priority associated with each IP block.

Similarly, while the description has described controlling the receipt of messages at a shared receive queue for a first IP block, in general, each IP block will generally transmit and receive messages continuously, and the shared receive buffer will control the receipt of messages for all IP blocks associated therewith. Hence, while the example in FIGS. 7A-C illustrates the management of receive credit allocation for a single IP block receiving messages from a small group of transmitting IP blocks, the invention is not so limited. In general, in distributed processing systems configured with high numbers of threads (e.g., hundreds, thousands, etc.) may control the communication of high numbers of messages communicated between such high numbers of IP blocks consistent with embodiments of the invention.

While the invention has been illustrated by a description of the various embodiments and the examples, and while these embodiments have been described in considerable detail, it is not the intention of the applicants to restrict or in any other way limit the scope of the appended claims to such detail. For example, the blocks of any of the flowcharts may be re-ordered, processed serially and/or processed concurrently without departing from the scope of the invention. Moreover, any of the flowcharts may include more or fewer blocks than those illustrated consistent with embodiments of the invention.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method for managing communication in a plurality of interconnected integrated processor (IP) blocks, the method comprising:
   controlling receipt of messages at a shared receive buffer of a first IP block communicated from transmitting IP blocks based on receive credits allocated to each transmitting IP block; and
   dynamically managing the allocation of receive credits for each transmitting IP block, including:
      initially allocating the receive credits to the transmitting IP blocks by dynamically determining a respective allocation of receive credits for each transmitting IP block and communicating to each transmitting IP block the respective allocation of receive credits therefor;
      thereafter monitoring message traffic received from the transmitting IP blocks; and
      based at least in part upon the monitored message traffic, dynamically reallocating the receive credits among the transmitting IP blocks by dynamically adjusting the respective allocation of receive credits for at least one transmitting IP block and sending a message to the at least one transmitting IP block to adjust the respective allocation of receive credits therefor.

2. The method of claim 1, wherein dynamically managing the allocation of receive credits for each transmitting IP block is based at least in part on a priority associated with each transmitting IP block.

3. The method of claim 2, wherein dynamically managing the allocation of receive credits for each transmitting IP block comprises:
   reallocating at least one receive credit from a transmitting IP block having a low priority to a transmitting IP block having a high priority.

4. The method of claim 1, wherein each receive credit corresponds to a quantity of messages that may be received at the shared receive buffer for a given time period.

5. The method of claim 4, wherein dynamically managing the allocation of receive credits for each transmitting IP block is based at least in part on a usage of allocated receive credits for the given time period.

6. The method of claim 4, wherein the shared receive buffer is of a fixed storage size, and dynamically managing the allocation of receive credits for each transmitting IP block is based at least in part on the fixed storage size such that the quantity of messages that may be received at the shared receive buffer for a given time period corresponds to the fixed storage size.

7. The method of claim 4, wherein dynamically managing the allocation of receive credits for each transmitting IP block is based at least in part on a rate at which each transmitting IP block uses allocated receive credits for the given time period.

8. The method of claim 1, further comprising:
in response to a particular transmitting IP block not using all receive credits within a given time period, reclaiming at least one allocated receive credit from the particular transmitting IP block.

9. The method of claim 1, further comprising:
in response to a particular transmitting IP block using all receive credits within a given time period, allocating at least one additional receive credit to the particular transmitting IP block.

10. The method of claim 1, wherein dynamically managing the allocation of receive credits for each transmitting IP block comprises:
updating a counter for the shared receive queue associated with a transmitting IP block responsive to receiving a message from the transmitting IP block.

11. The method of claim 10, further comprising:
analyzing the counter associated with the transmitting IP block to determine a rate at which the transmitting IP block uses allocated receive credits.

12. The method of claim 11, wherein each receive credit corresponds to a message that may be transmitted to the shared receive queue for a given time period, the method further comprising:
allocating at least one additional receive credit to the transmitting IP block based at least in part on the rate at which the transmitting IP block uses allocated receive credits for the given time period.

13. The method of claim 1, wherein dynamically managing the allocation of receive credits for each transmitting IP block further includes maintaining a reserve of unallocated receive credits when initially allocating and dynamically reallocating the receive credits.

14. The method of claim 1, wherein dynamically managing the allocation of receive credits for each transmitting IP block includes initially allocating receive credits to a first transmitting IP block prior to receiving any message from the first transmitting IP block.

* * * * *